(12) United States Patent
Alves (10) Patent No.: US 11,240,410 B1
(45) Date of Patent: Feb. 1, 2022

(54) CONTROL AND MONITORING OF BODY WORN CAMERAS

(71) Applicant: Ramona E. Alves, Mill Valley, CA (US)

(72) Inventor: Ramona E. Alves, Mill Valley, CA (US)

(73) Assignee: ALVES TECHNICAL INNOVATIONS LLC, Mill Valley, CA (US)

( * ) Notice: Subject to any disclaimer, the term of this patent is extended or adjusted under 35 U.S.C. 154(b) by 0 days.

(21) Appl. No.: 17/241,541

(22) Filed: Apr. 27, 2021

(51) Int. Cl.
| | |
|---|---|
| H04N 5/225 | (2006.01) |
| H04N 5/232 | (2006.01) |
| H04M 1/72463 | (2021.01) |
| H04N 1/00 | (2006.01) |
| H04N 101/00 | (2006.01) |
| H04N 1/32 | (2006.01) |
| G03B 17/56 | (2021.01) |
| H04N 5/77 | (2006.01) |

(52) U.S. Cl.
CPC ......... *H04N 5/2252* (2013.01); *G03B 17/566* (2013.01); *H04M 1/72463* (2021.01); *H04N 1/00127* (2013.01); *H04N 1/00204* (2013.01); *H04N 1/00307* (2013.01); *H04N 1/00917* (2013.01); *H04N 5/23206* (2013.01); *H04N 5/232939* (2018.08); *H04N 5/772* (2013.01); *H04N 1/32112* (2013.01); *H04N 2101/00* (2013.01); *H04N 2201/0084* (2013.01); *H04N 2201/0096* (2013.01); *H04N 2201/3202* (2013.01)

(58) Field of Classification Search
CPC ........... H04N 5/2252; H04N 5/232939; H04N 5/23206; H04N 5/772; H04N 1/00127; H04N 1/00204; H04N 1/00307; H04N 1/00917; H04N 1/32112; H04N 2101/00; H04N 2201/0084; H04N 2201/0096; H04N 2201/3202; G03B 17/566; H04M 1/72463

See application file for complete search history.

(56) References Cited

U.S. PATENT DOCUMENTS

| | | | |
|---|---|---|---|
| 10,003,960 B2 | 6/2018 | Alvez | |
| 10,872,636 B2 | 12/2020 | Smith et al. | |
| 10,885,937 B2 | 1/2021 | Ross et al. | |
| 10,901,754 B2 * | 1/2021 | Wagner | ................ G06F 13/102 |
| 10,911,725 B2 | 2/2021 | Ross | |
| 10,917,614 B2 | 2/2021 | Haler et al. | |
| 2009/0273682 A1 * | 11/2009 | Shekarri | ................ G01P 1/127 |
| | | | 348/207.1 |

\* cited by examiner

*Primary Examiner* — Nelson D. Hernández Hernández
(74) *Attorney, Agent, or Firm* — Kintner IP, LLC; Mary Frances Ludwig (57) ABSTRACT

A video recording system improves the control and monitoring of body worn cameras, such as those worn by police. The system may communicate through a private radio network. Operation of cameras and other controlled devices are configured by a system controller. Events of interest may be recorded, may initiate or restrict system functions, and may be collected for evaluating system efficacy and policy compliance. Body worn cameras of the system begin recording video upon being disconnected from a camera dock. A mobile device may be associated with the camera and have a recording management application. The controller may synchronize settings for the camera with the recording management application, and the mobile device has no administrative control over the application.

21 Claims, 5 Drawing Sheets

| END OF SHIFT REPORT | DATE: DD/MM/YYYY |
|---|---|
| OFFICER ID | XXXX |
| CAMERA ID | YYYY |
| CAMERA OPEN | 08:00 |
| CAMERA CLOSED | 16:30 |
| TOTAL SHIFT | 8.5 |
| TOTAL RECORDING | 6.5 |
| DAILY PERCENTAGE | 76% |

PAUSE CYCLES

| IN OFFICE | 0.5 |
|---|---|
| MEAL | 1 |
| BREAKS | 0.5 |

TIME STAMPS

| SIREN | 09:30 |
|---|---|
| FOOT CHASE | 11:00 |
| GUN SHOT | 14:30 |

CONTROL AND MONITORING OF BODY WORN CAMERAS

CROSS REFERENCE TO RELATED APPLICATION

None

TECHNICAL FIELD

The present invention pertains generally to video recording systems, and more particularly to control and monitoring of body worn camera systems.

BACKGROUND OF THE INVENTION

Programs directed at increasing oversight and accountability of police officers often include a requirement that an officer have a body worn camera, at least in certain circumstances. However, such programs may be inconsistently used within police departments, and specific requirements often differ across various state and regional departments. These inconsistencies make evaluating the efficacy of body worn camera requirements difficult.

In some body worn camera systems video recording is started, stopped, or paused by the officer wearing the camera. These systems may not be recording in all circumstances where oversight is desired, as an officer may be preoccupied and forget or neglect to turn on the camera. In some systems a body worn camera may receive inputs which start recording, such as a detected noise. These systems are still susceptible to not recording events, such as when an input is not received, or to being turned off by the wearer.

There is therefore a need in the art for a body worn camera system where recording functions are controlled independently of the wearer.

BRIEF SUMMARY OF THE EMBODIMENTS

Embodiments disclosed herein are directed to a video recording system which improves the control and monitoring of body worn cameras such as those worn by police. The system may communicate through a private, asymmetrically secured, wide area wireless communication network. The network is designed to securely monitor the use of and communicate control functions to devices in the field. Examples of controlled devices include mobile devices, such as cell phones or tablets, body worn cameras, holster sensors, shot detectors, and other devices that warrant monitoring and control.

In embodiments, operating functions of controlled devices are configured by a controller. The controller may record an event indicator, such as a timestamp, upon detection of an event of interest, for example, a pause in video recording of a body worn camera or an audible gun shot. The event indicators and corresponding data collection may be used for purposes of evaluating policy compliance, officer community engagement practices, and numerous other possibilities in evaluating daily performance of officers.

According to one or more embodiments, a video recording system cooperates with a radio network and a mobile device. The system includes:

a camera dock;

a camera connectable to the camera dock and configured to begin recording video upon being disconnected from the camera dock;

a wearable housing associated with the camera and configured for mounting the camera thereon, the wearable housing configured to detect mounting of the camera;

wherein the camera dock is configured to transmit a first trigger signal to the mobile device, via the radio network, when the camera is disconnected from the camera dock;

wherein, when the first trigger signal is received, the mobile device is configured to:

activate a recording management application installed on the mobile device;

initiate communication with the camera;

receive an input associated with a recording pause time; and in response to the input, initiate a pause in video recording of the camera, the pause having a maximum duration of the recording pause time; and wherein the mobile device has no administrative control over the recording management application.

According to one or more embodiments, the camera dock is configured to transmit a second trigger signal to the wearable housing, via the radio network, when the camera is disconnected from the camera dock. In some embodiments, the wearable housing is configured to transmit a first notification via the radio network when the camera is connected to the wearable housing, and transmit a second notification via the radio network when the camera is disconnected from the wearable housing. In this manner, the wearable housing may provide confirmation that the camera is being worn. The wearable housing may transmit notifications directly to the controller, to the mobile device, or to the camera dock.

According to one or more embodiments, the camera has a camera identification associated with the mobile device.

According to one or more embodiments, the camera is configured to end recording video only upon being connected to the camera dock.

According to one or more embodiments, the recording pause time is configured by a controller in communication with the mobile device. In embodiments, the recording management application is synchronized to the controller.

According to one or more embodiments, the recording management application is configured to restrict pausing of the video recording upon detection of an event of interest. In some embodiments, the recording management application is configured to receive an indicator of an event of interest from a cooperating sensor. In cooperation with the sensor, the application may automatically resume recording video or restrict pausing functionality when an event of interest is detected.

According to one or more embodiments, the mobile device cannot disable or modify the recording management application.

These and other aspects of the embodiments will be better appreciated and understood when considered in conjunction with the following description and the accompanying drawings. The following description, while indicating various embodiments and details thereof, is given by way of illustration and not of limitation. Many substitutions, modifications, additions, or rearrangements may be made within the scope of the embodiments, and the embodiments may include all such substitutions, modifications, additions, or rearrangements.

BRIEF DESCRIPTION OF THE DRAWINGS

Non-limiting and non-exhaustive embodiments of the video recording system for body worn cameras are described with reference to the following figures, wherein like reference numerals refer to like parts throughout the various views unless otherwise specified.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. Also, common but well-understood elements that are useful or necessary in a commercially feasible embodiment are often not depicted in order to facilitate a less obstructed view of these various embodiments.

LIST OF DRAWING REFERENCE NUMERALS 20 system
22 private network
24 radio network
26 controller
30 camera dock
32 camera
34 microprocessor
40 housing
42 sensor
50 mobile device
51 recording management application
52a-52d pause types
54a-54d time indicators
60 first trigger signal
62 second trigger signal
70 short-range communication link
100 first method
200 second method
400 report
500 garment
600 location sensor
700 holster

DETAILED DESCRIPTION OF THE INVENTION

Figure 1:
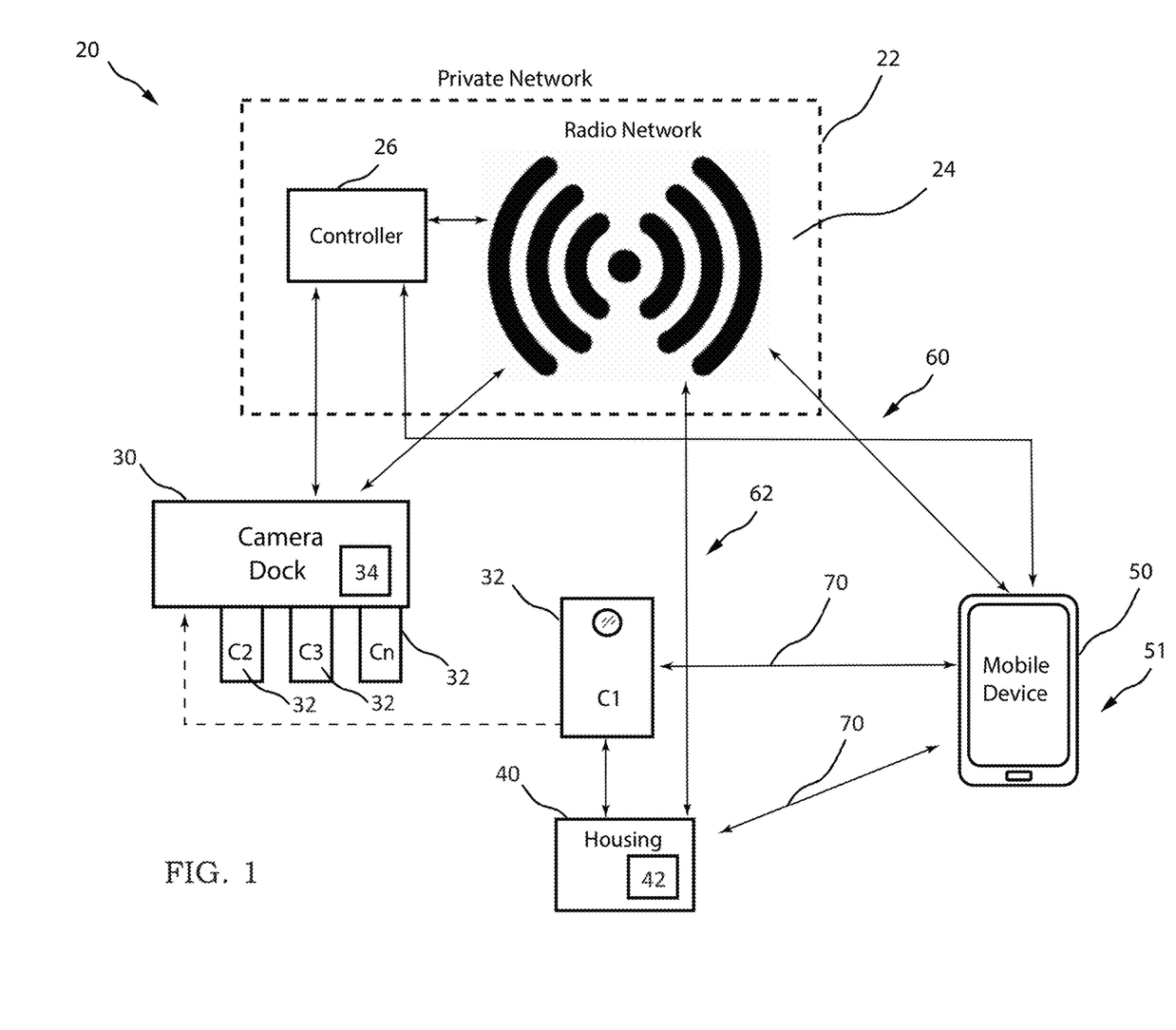
FIG. 1 is an example schematic diagram of an embodiment of a video recording system.

FIG. 1 illustrates an embodiment of a video recording system generally designated as 20. Elements of system 20 communicate via a private network 22 which includes a radio network 24 and a controller 26. Radio network 24 may be an asymmetrically encrypted radio network, for example a radio network operating on either the Project 25 (P25) or the Terrestrial Trunked Radio (TETRA) protocols. Controller 26 may be any device capable of storing, processing, and communicating information in accordance with embodiments of the system described herein. For example, the controller may be a personal computer, a server, or a mobile device, among other devices. Controller 26 may communicate with other devices in the system through a wired or wireless LAN connection, a cellular network, or similar connection.

As used in this application, the conjunction "or" is to be construed inclusively (e.g., "A or B" would be interpreted as "A, or B, or both A and B"; e.g., "A, B, or C" would be interpreted as "A; or B; or C; or any two of A, B, and C; or all three of A, B, and C").

One or more cameras 32 may be electrically or mechanically connected to a camera dock 30; several cameras C1, C2, C3, . . . Cn are present in the shown embodiment. Camera 32 is generally a wearable video camera, also referred to as a body worn camera (BWC). Camera 32 may connect to camera dock 30 for electrical charging, data transfer, receiving configuration settings, system updates, or the like. The dashed line between camera C1 and camera dock 30 indicates that camera C1 is also connectable to the camera dock.

Camera 32 is configured to begin recording video upon being disconnected from camera dock 30. In an embodiment, camera 32 may default to recording when not connected to the camera dock. Camera 32 may begin recording automatically upon disconnection from the camera dock, without needing to receive any electrical or communications based trigger signal or user input. In embodiments, the camera is configured to end recording video only upon being connected to the camera dock; in other words camera 32 is configured to default to continuously recording video whenever the camera is not connected to the camera dock.

In embodiments, camera 32 does not have any user accessible control features (such as a power switch, pause button, or the like). The user may not manually start or stop recording by interfacing with system hardware.

Figure 2:
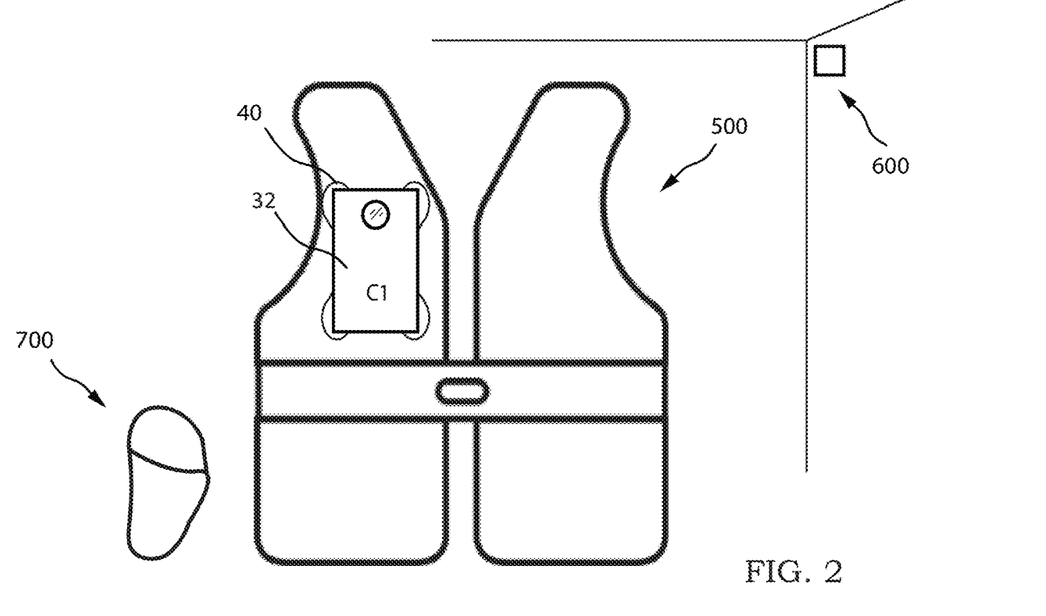
FIG. 2 is an example illustration of an embodiment of a wearable housing of the system.

A wearable housing 40 is configured for mounting camera 32 on while in use. FIG. 2 illustrates housing 40 on a cooperating garment 500, such as a vest. In alternate configurations, housing 40 may be mounted on or integrated into a jacket, armband, headgear, or other garment or body wearable accessory.

Housing 40 is configured to detect when camera 32 is mounted to housing 40. Housing 40 may be configured to detect a connected camera electrically, mechanically, optically, or by other sensing configurations. The camera may have an identifying chip which is sensed by the housing. In embodiments, housing 40 may transmit a first notification to the controller via the radio network when the camera is connected to the housing. In some embodiments, housing 40 may transmit a second notification via the radio network when the camera is disconnected from the housing. An event indicator associated with either or both of the first or second notifications may be stored by the controller. The event indicator may include a timestamp, an event code, a hardware identifier, or other data related to the event.

A cooperating mobile device 50 may be in communication with camera 32 or housing 40. Communication between mobile device 50 and camera 32 or housing 40 may be a short-distance wireless communication link 70, such as Bluetooth. In an exemplary method of use, when a camera 32 (e.g., C1) is disconnected from camera dock 30, the camera dock transmits a first trigger signal 60 to a mobile device which is associated with camera 32. The first trigger signal may be a low frequency radio signal sent via radio network 24. In response to first trigger signal 60, a recording management software application (app) 51 installed on the mobile device may be activated. The app may initiate communication between mobile device 50 and camera 32 or housing 40.

A specific camera 32 may be associated with a specific mobile device 50. For example, controller 26 may store a camera ID and a mobile device ID which may be associated with one another. In some embodiments, a user profile may be associated with a specific camera ID or mobile device ID. In other embodiments, a specific housing 40 may be associated with a specific camera 32; a paired camera and housing may be associated with a mobile device; a paired housing and mobile device may be associated with a camera; and other configurations may be readily envisioned to achieve an equivalent result.

Camera dock 30 may transmit a second trigger signal 62 to housing 40 associated with camera 32, when camera 32 is disconnected from the camera dock. The second trigger signal may also be a low frequency radio signal sent via radio network 24. The second trigger signal may initiate a status confirmation sequence, wherein the housing transmits a confirmation of camera connection status. The confirmation may be transmitted to controller 26 through the radio network or to the mobile device for subsequent communication to the controller.

If confirmation that the camera is connected is not received from the housing, the system may repeatedly query the camera. The system may record an event indicator showing that the camera was not properly mounted on the housing. A warning may be displayed in the app to notify the user that the camera is not properly connected. Similarly, a confirmation indicator may be provided in the app so that a user may readily observe that the camera is communicating properly (e.g., a red light/green light status symbol).

Figure 3:
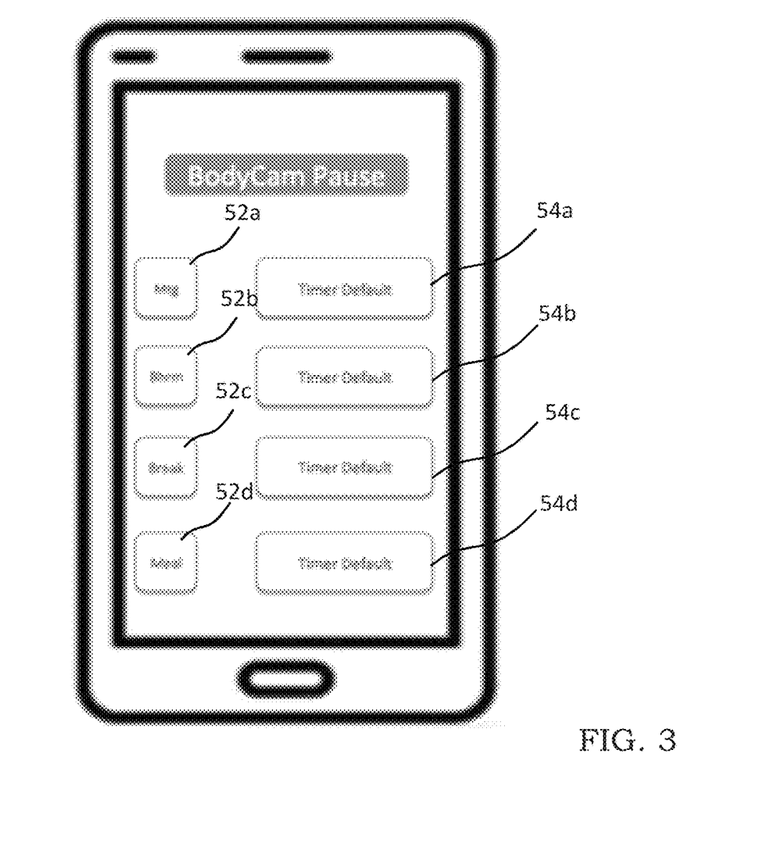
FIG. 3 is an example illustration of an embodiment of a user interface of the system.

While the camera may default to always recording, system settings may permit a user to pause recording throughout their shift. Pauses in recording may be activated by the user though the recording management application on the mobile device. FIG. 3 is an example illustration of an embodiment of a graphical user interface (GUI) of the app. A set of preconfigured pause types, 52a-52d, are shown at left. The user may input a selection of a pause type through the mobile device, such as by using a touch screen.

Each pause type may be associated with a recording pause time having a maximum duration. The duration of each pause type may be configured by a manager, stored in the controller, and communicated via private network 22 to the recording management application. In response to the input selection, mobile device 50 may initiate a pause in video recording of camera 32, via short-range communication connection 70.

The GUI may also display a time indicator associated with each pause type, shown in FIG. 3 as 54a-54d. The time indicator may show a maximum duration associated with each pause type, it may count down or up as an activated pause period elapses, it may be shown in a different color (e.g., grey) if unavailable for a particular user or shift, or other indications may be displayed. The GUI may accept an input from the user which ends a pause before the maximum duration is reached. Information related to pauses, such as pause type, start time, stop time, and duration, may be communicated to the controller and may be presented in a shift report, discussed further below.

Examples of pre-configured pause types and their corresponding times are: a meeting (52a) having a timer default (54a) of 40 minutes; a bathroom break (52b) having a timer default (54b) of 10 minutes; a break (52c) having a timer default (54c) of 30 minutes; a meal (52d) having a timer default (54d) of 60 minutes. Other pause types may be configured by the system manager, and will vary depending on the circumstances and environment of use. For example, a user in the field may be restricted from pausing recording while taking a break; a user may be unable to pause recording for any reason while in a designated restricted area; or a user may be permitted to disable recording while in the office. FIG. 2 illustrates a location sensor 600 which may communicate over private network 22. Location sensor 600 may, for example, be configured to communicate with the system if a mobile device, a camera, or a housing is detected within a specified area. When within the sensor area, use of the app may be restricted for a designated restricted area such as a cell block or interview room. Alternatively, unrestricted use of pause features of the app may be permitted in areas such as break rooms, bathrooms, or offices.

Additional information may be displayed in the GUI, such as communication status indicators, user ID, camera ID, date and time, length of shift, or the like.

The camera may be configured to record an event indicator as described above when an event of interest is detected. Event indicators may be communicated to the controller and stored for later review. Some events of interest may be audibly detected, such as a siren or gunshot. Other events of interest may be detectable by a device carried by the user. For example, an accelerometer in the mobile device may indicate that the user is running, which may be communicated as an event of interest (such as possibly a foot chase). A gun holster worn by the user (see FIG. 2, holster 700) may be equipped with a sensor for detecting removal of the gun from the holster, which may also be communicated as an event of interest.

The system may be administered and configured by a manager permitted to access controller 26. The manager may oversee operations such as installing the recording management application on mobile devices, monitoring associations of hardware components, configuring detection of events of interest, setting user permissions for recording pause functions, configuring shift reports, and similar administrative functions. The manager may be, for example, a dispatch unit, a supervisor, a human resources department, a central control group, or a governing office. The manager may follow standard operating procedures or general best practices set forth for body worn camera systems. In embodiments, the mobile device has no administration control over the recording management application installed thereon. The mobile device cannot disable or modify the application. The application will only accept inputs configured or approved by the system manager.

Figure 4:
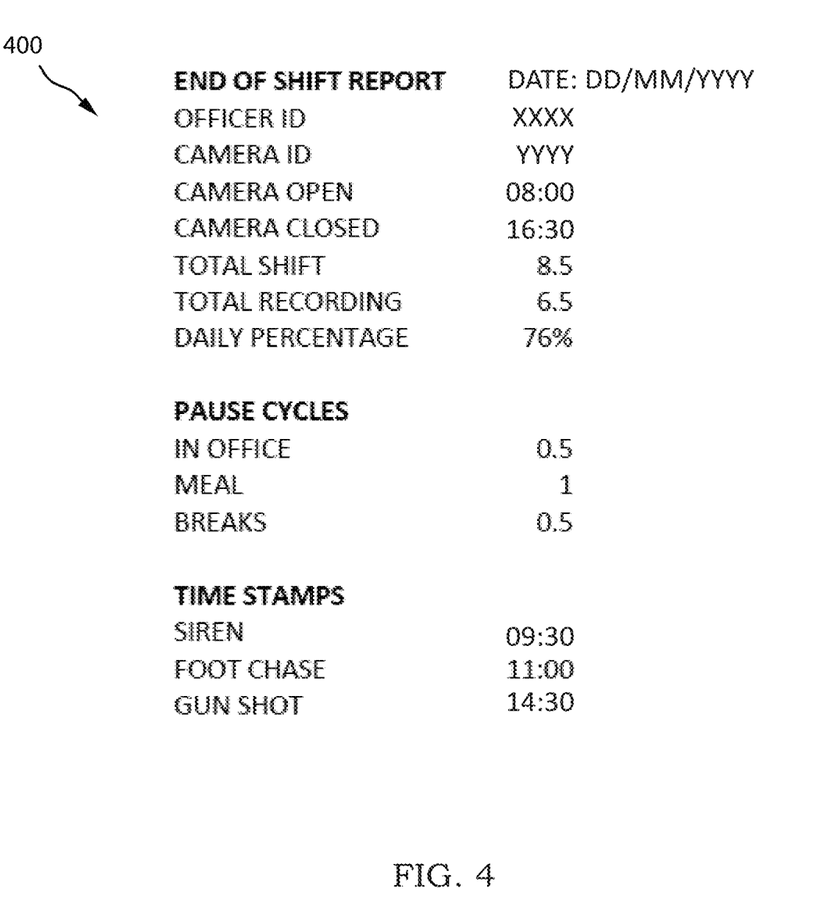
FIG. 4 is an example of a shift report generated in coordination with the system.

FIG. 4 provides an example of a shift report 400 which may be generated by the system. Information provided in the shift report may include a date; an officer or user ID; a camera ID; a mobile device ID; a housing ID; a camera open time, which may be associated with the first notification sent by the housing; or a camera close time, which may be associated with the second notification sent by the housing. Information related to pauses may be provided in the report, such as number of pauses; start or stop time of pauses; total length of pauses; or types of pauses. A total time of shift, total recording time, or percentage of shift time recorded may be calculated from other data and provided in the report. A list of events of interest and corresponding event indicators (timestamps in the shown example) may be provided in the report. In the shown example three events of interest for the shift were a siren at 09:30, foot chase at 11:00, and gun shot at 14:30. These timestamps may later be used to review specific parts of the video.

In embodiments, an existing video recording system may be retro-fit to operate as described herein. For example, a microprocessor 34 may be added to a camera dock 30 to handle communication aspects of the system; a sensor 42 may be added to a housing 40 to sense connection of the camera. Where appropriate hardware may be in place, components of the system may be modified in firmware to function as described herein.

In terms of use, a first method 100 of operating a video recording system 20 in cooperation with a radio network 24 and a mobile device 50 includes: (refer to FIG. 1-5)
- (a) disconnecting 102 a camera 32 from a camera dock 30;
- (b) upon disconnecting the camera from the camera dock, the camera initiating 104 video recording;
- (c) the camera dock transmitting 106 a first trigger signal 60 to the mobile device, via the radio network;
- (d) when the first trigger signal is received, the mobile device activating 108 a recording management application 51 installed on the mobile device;
- (e) when the first trigger signal is received, the mobile device initiating 110 communication between the mobile device and the camera;
- (f) the mobile device receiving 112 an input, the input associated with a recording pause time;
- (g) in response to the input, the mobile device initiating 114 a pause in video recording of the camera, the pause having a maximum duration of the recording pause time; and
- wherein the mobile device has no administrative control over the recording management application.

Figure 5:
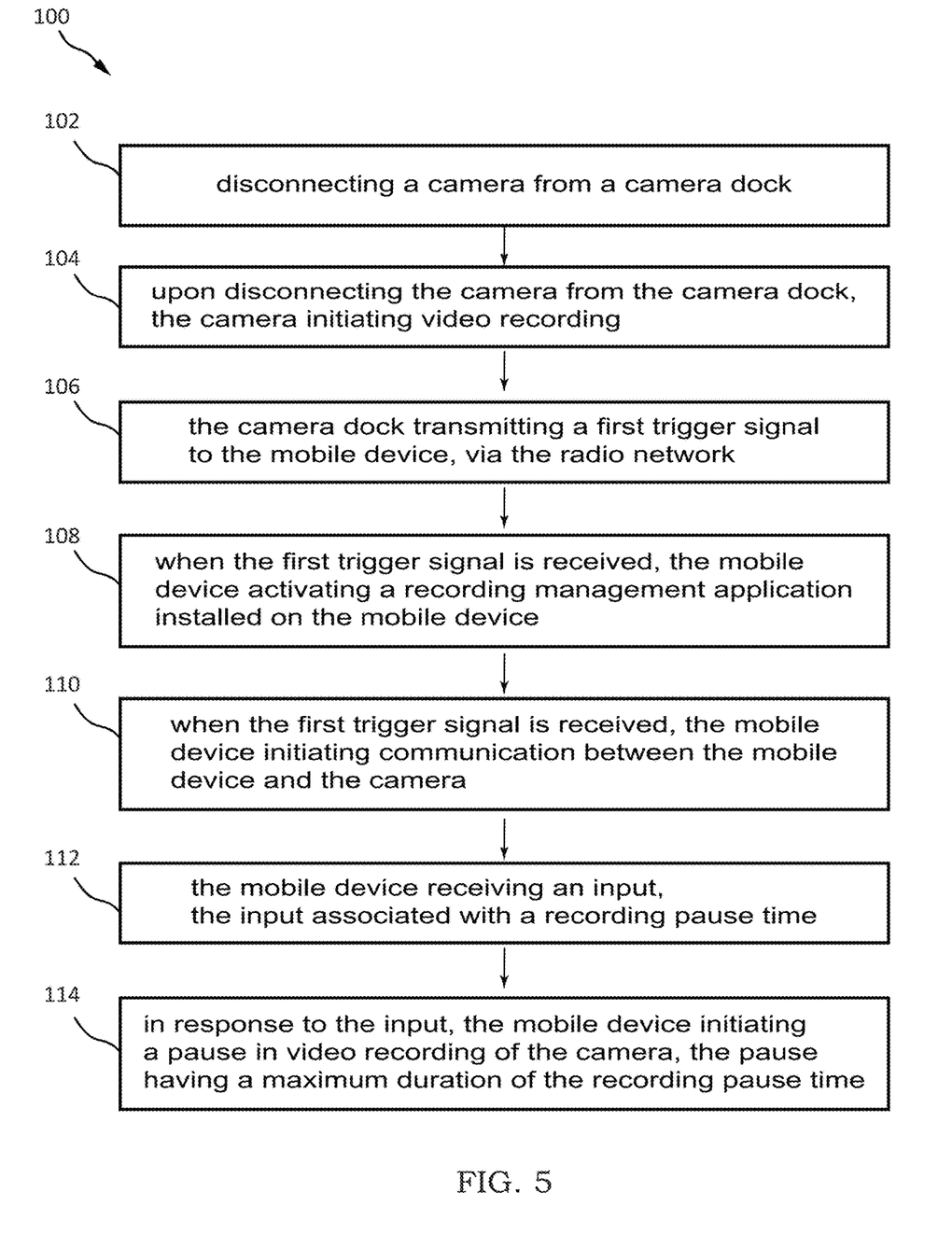
FIG. 5 is an example flow-chart of an embodiment of a method of operating the video recording system.
Figure 6:
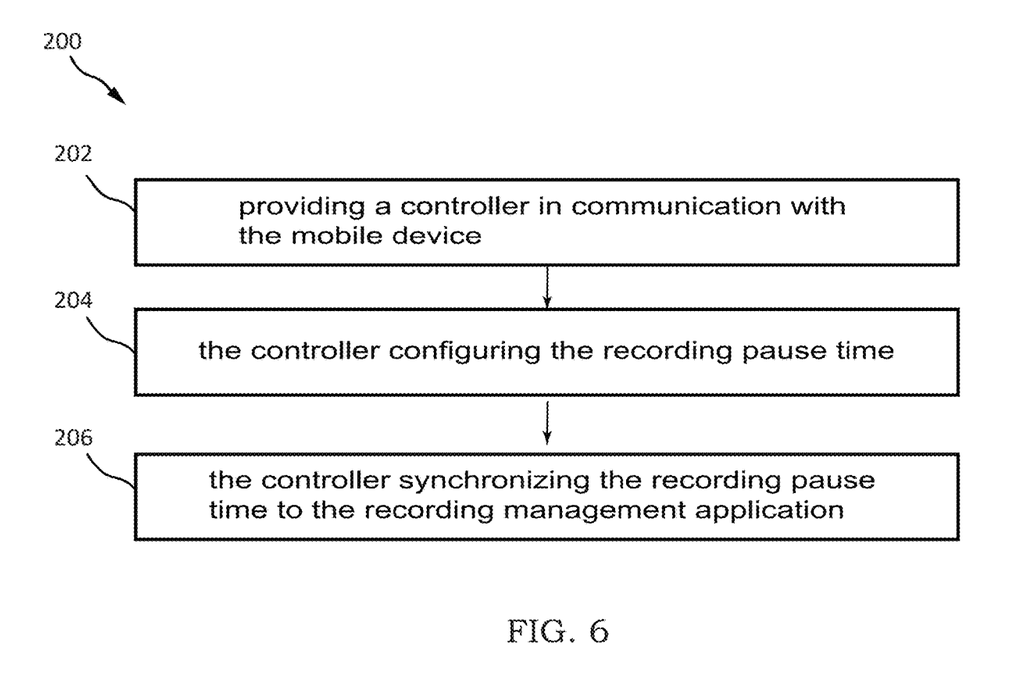
FIG. 6 is an example flow-chart of an embodiment of a method of operating the video recording system having a controller.

The method may further include: camera dock 30 transmitting a second trigger signal 62 a wearable camera housing 40, via radio network 24.

Any of the preceding methods may further include, wherein camera 32 has a camera identification associated with mobile device 50, camera dock 30 transmitting the camera identification to the radio network.

Any of the preceding methods may further include, when the camera is disconnected from the camera dock, the camera dock transmitting a second trigger signal to the wearable housing, via the radio network.

Any of the preceding methods may further include, when the camera is connected to the wearable housing, the wearable housing transmitting a first notification; and
when the camera is disconnected from the wearable housing, the wearable housing transmitting a second notification.

A second method 200 may include the steps of method 100 and further include: (refer to FIG. 1-6)
- (h) providing 202 a controller 26 in communication with the mobile device;
- (i) the controller configuring 204 the recording pause time; and
- (j) the controller synchronizing 206 the recording pause time to the recording management application.

Method 200 may further include, when an event of interest is detected, the mobile device transmitting an event indicator to the controller.

Method 200 may further include, when an event of interest is detected, the recording management application restricting pausing of the video recording.

Method 200 may further include:
the controller generating a shift report associated with the camera;
when the input associated with a recording pause time is received by the mobile device, the mobile device transmitting an event indicator to the controller; and
when an event indicator is received by the controller, the controller recording the event indicator in the shift report.

The embodiments of the system and methods of use described herein are exemplary and numerous modifications, combinations, variations, and rearrangements can be readily envisioned to achieve an equivalent result, all of which are intended to be embraced within the scope of the appended claims. Further, nothing in the above-provided discussions of the systems and methods should be construed as limiting the invention to a particular embodiment or combination of embodiments. The scope of the invention is defined by the appended claims.

I claim:

1. A video recording system cooperating with a radio network and a mobile device, the system comprising:
a camera dock;
a camera connectable to the camera dock and configured to begin recording video upon being disconnected from the camera dock;
a wearable housing associated with the camera and configured for mounting the camera thereon, the wearable housing configured to detect mounting of the camera;
wherein the camera dock is configured to transmit a first trigger signal to the mobile device, via the radio network, when the camera is disconnected from the camera dock;
wherein, when the first trigger signal is received, the mobile device is configured to:
activate a recording management application installed on the mobile device;
initiate communication with the camera;
receive an input associated with a recording pause time; and
in response to the input, initiate a pause in video recording of the camera, the pause having a maximum duration of the recording pause time; and
wherein the mobile device has no administrative control over the recording management application.

2. The video recording system of claim 1, wherein the camera dock is configured to transmit a second trigger signal to the wearable housing, via the radio network, when the camera is disconnected from the camera dock.

3. The video recording system of claim 1, wherein the wearable housing is configured to:
transmit a first notification via the radio network when the camera is connected to the wearable housing; and
transmit a second notification via the radio network when the camera is disconnected from the wearable housing.

4. The video recording system of claim 1, wherein the camera has a camera identification associated with the mobile device.

5. The video recording system of claim 1, wherein the camera is configured to end recording video only upon being connected to the camera dock.

6. The video recording system of claim 1, wherein the recording pause time is configured by a controller in communication with the mobile device.

7. The video recording system of claim 6, wherein the recording management application is synchronized to the controller.

8. The video recording system of claim 1, wherein the recording management application is configured to restrict pausing of the video recording upon detection of an event of interest.

9. The video recording system of claim 1, wherein a controller in communication with the mobile device is configured to record an event indicator upon detection of an event of interest.

10. The video recording system of claim 1, further cooperating with a plurality of mobile devices, the system including:
a plurality of cameras each connectable to the camera dock and having a camera identification associated with one of the plurality of mobile devices; and
wherein the camera dock is configured to transmit a first trigger signal to one of the plurality of mobile devices, via the radio network, when the camera associated with the one mobile device is disconnected from the camera dock.

11. The video recording system of claim 1, wherein the mobile device cannot disable or modify the recording management application.

12. The video recording system of claim 1, further cooperating with a sensor, wherein the recording management application is configured to receive an indicator of an event of interest from the sensor.

13. A method of operating a video recording system in cooperation with a radio network and a mobile device, the method including:
disconnecting a camera from a camera dock;
initiating video recording, by the camera, upon disconnecting the camera from the camera dock;
transmitting a first trigger signal, by the camera dock via the radio network, to the mobile device;
activating a recording management application installed on the mobile device, by the mobile device when the first trigger signal is received;
initiating communication between the mobile device and the camera, by the mobile device when the first trigger signal is received;
receiving an input, by the mobile device, the input associated with a recording pause time;
initiating a pause in video recording of the camera, by the mobile device in response to the input, the pause having a maximum duration of the recording pause time; and
wherein the mobile device has no administrative control over the recording management application.

14. The method of claim 13, further including:
transmitting a second trigger signal, by the camera dock via the radio network, to a wearable camera housing.

15. The method of claim 13, wherein the camera has a camera identification associated with the mobile device, the method further including:
transmitting, by the camera dock, the camera identification to the radio network.

16. The method of claim 13, further including:
when the camera is disconnected from the camera dock, transmitting a second trigger signal to the wearable housing, by the camera dock via the radio network.

17. The method of claim 13, further including:
when the camera is connected to the wearable housing, transmitting a first notification by the wearable housing; and
when the camera is disconnected from the wearable housing, transmitting a second notification by the wearable housing.

18. The method of claim 13, further including:
providing a controller in communication with the mobile device;
configuring, by the controller, the recording pause time; and
synchronizing, by the controller, the recording pause time to the recording management application.

19. The method of claim 18, further including:
when an event of interest is detected, transmitting to the controller, by the mobile device, an event indicator.

20. The method of claim 18, further including:
when an event of interest is detected, restricting pausing of the video recording by the recording management application.

21. The method of claim 18, further including:
generating, by the controller, a shift report associated with the camera;
when the input associated with a recording pause time is received by the mobile device, transmitting to the controller, by the mobile device, an event indicator; and
when an event indicator is received by the controller, recording the event indicator in the shift report, by the controller.

* * * * *